United States Patent [19]
Sicre et al.

[11] Patent Number: 6,161,062
[45] Date of Patent: Dec. 12, 2000

[54] AIRCRAFT PILOTING AID SYSTEM USING A HEAD-UP DISPLAY

[75] Inventors: Jean-Luc Sicre, Fontenay Aux Roses; Patrice Guillard, Valence, both of France

[73] Assignee: Sextant Avionique, Velizy Villacoublay, France

[21] Appl. No.: 09/101,759

[22] PCT Filed: Jan. 14, 1997

[86] PCT No.: PCT/FR97/00058

§ 371 Date: Jul. 20, 1998

§ 102(e) Date: Jul. 20, 1998

[87] PCT Pub. No.: WO97/26553

PCT Pub. Date: Jul. 24, 1997

[30] Foreign Application Priority Data

Jan. 19, 1996 [FR] France ................................... 96 00603

[51] Int. Cl.[7] .................................................. G01C 21/00
[52] U.S. Cl. .................................. 701/3; 701/3; 701/214; 701/215; 340/980; 340/974; 342/357
[58] Field of Search .................................. 701/3, 11, 13, 701/213, 215; 244/3.1, 75; 340/961; 364/428, 449

[56] References Cited

U.S. PATENT DOCUMENTS

| | | | |
|---|---|---|---|
| 4,881,080 | 11/1989 | Jablonski | 342/357 |
| 5,101,356 | 3/1992 | Timothy et al. | 364/449 |
| 5,212,480 | 5/1993 | Ferro | 340/974 |
| 5,357,263 | 10/1994 | Fischer et al. | 345/9 |
| 5,361,212 | 11/1994 | Class et al. | 364/428 |
| 5,392,052 | 2/1995 | Eberwine | 342/357 |
| 5,506,587 | 4/1996 | Lans | 342/357 |
| 5,654,890 | 8/1997 | Nicosia et al. | 364/428 |
| 5,666,111 | 9/1997 | Servat et al. | 340/980 |
| 5,714,948 | 2/1998 | Farmakis | 340/961 |
| 6,088,653 | 7/2000 | Sheikh et al. | 701/214 |

*Primary Examiner*—William A. Cuchlinski, Jr.
*Assistant Examiner*—Tuan To
*Attorney, Agent, or Firm*—Oblon, Spivak, McClelland, Maier & Neustadt, P.C.

[57] ABSTRACT

The invention relates to systems for aiding the piloting of aircraft, mainly for take-off and landing under poor conditions of visibility.

In order to benefit from the contribution of head-up displays, which exhibit symbols for the artificial horizon line, aircraft longitudinal attitude and ground speed vector, without using an IRS inertial unit to supply the heading and attitude information, it is proposed to use a non-inertial AHRS unit associated with a compass, and periodically to correct the information which it supplies, in order to exhibit the attitude symbols with the aid of the corrected information rather than the raw information from the AHRS unit. The correction is given by two GPS receivers (GPS1, GPS2) associated with antennas (A1, A2) on the top of the aircraft, an interferometric measurement of radiofrequency carrier phase being made to determine a direction vector of the aircraft.

Application to the modernisation of aircraft equipped with non-inertial AHRS units so as to allow landings and take-offs in all conditions, including conditions of very poor visibility.

15 Claims, 3 Drawing Sheets

AIRCRAFT PILOTING AID SYSTEM USING A HEAD-UP DISPLAY

The invention relates to the aiding of the piloting of aircraft, mainly at take-off and landing, especially to enable the aircraft to take off or land under mediocre visibility conditions.

The trend nowadays is to use head-up displays (HUDs) to aid piloting: these displays make it possible to exhibit visual indications for the benefit of the pilot, these being superimposed on the actual landscape and facilitating the assessment by the pilot of the state of the aircraft at a given moment. The main indications which may be displayed are:

- a horizon line which is superimposed on the actual horizon and which replaces the latter if the visibility conditions are poor; thus, the pilot still sees a horizon line which is horizontal if the aircraft is horizontal and which tilts if the aircraft tilts about its longitudinal axis;
- an attitude symbol which moves to a greater or lesser extent above or below the horizon depending on the longitudinal attitude of the aircraft: the pilot can ascertain the longitudinal attitude at a glance, this being an essential parameter for take-off or landing, or overshoot;
- and a velocity vector symbol which also enables the instantaneous path of the aircraft to be ascertained at a glance.

Thus, in the event of poor visibility these symbols enable the pilot to better ascertain the situation of the aircraft relative to a runway and a horizon which he has difficulty seeing. For example, an HUD system associated with an automatic pilot makes it possible to land with a vertical visibility of 35 feet (around 10 metres) and a horizontal visibility of 125 metres. Without an HUD system, the minimum visibility conditions to be complied with would have to be 50 feet (15 metres) vertically and 200 metres horizontally, in the case where the aircraft is equipped with an automatic pilot controlled by two air data units which supply the altitude and vertical velocity, and by two attitude reference units of the AHRS type (Attitude Heading Reference System) having no inertial platform, these being associated with two compasses and supplying longitudinal and lateral attitude information (on dials rather than superimposed on the landscape) together with the vertical and horizontal acceleration and the magnetic heading.

The head-up display HUD exhibits symbols calculated by a computer which uses information supplied by various detectors with which the aircraft is equipped (attitude, heading, velocities, position, altitude, etc).

However, the HUD displaying of the attitude and velocity vector symbols is only meaningful if it is sufficiently accurate. If this were not the case the symbols would be more of a nuisance than useful, the pilot not being able to rely on them for landing or take-off.

For this reason, a head-up display is generally combined with an inertial reference unit (or IRS standing for "Inertial Reference System") which can very accurately give the attitude (for example to within 0.2°) and the heading (for example to within 0.5°). It is this IRS unit which supplies the computer of the head-up display with the attitude, position and inertial velocity data necessary for computing and exhibiting the symbols on the HUD display.

Unfortunately an inertial unit is very expensive. An AHRS unit is much less expensive but less accurate. For a good AHRS unit, the accuracy in heading may be 1.5° and the accuracy in attitude 0.5°. In certain cases the unit is even less accurate and anyway not sufficiently accurate for the exhibiting of the head-up display symbology on the basis of the information from the unit to be truly meaningful.

Nevertheless, airlines are feeling the need to modernize aeroplanes by equipping them with head-up displays whereas they are equipped only with AHRS attitude and heading reference units of average quality, so that these airplanes can land and take off almost any day throughout the year regardless of the weather conditions.

Theoretically, therefore, these AHRS units ought to be replaced with IRS inertial units at the same time as the head-up display and its computer are installed so that the computer may receive accurate information from this unit. However, adding an IRS unit makes the system too expensive.

There is therefore a need for systems for aiding piloting
- which use a head-up display requiring accurate heading and attitude information
- and which, on cost grounds, do not in fact use an inertial unit to supply this information.

According to the invention there is proposed a system for aiding the piloting of an aircraft, which comprises a head-up display and its computer, the computer comprising means for controlling the display in order to exhibit symbols for aiding piloting, and especially an aircraft attitude symbol, characterized in that it furthermore comprises a non-inertial attitude and heading unit AHRS associated with a compass, for supplying heading, attitude, acceleration and vertical velocity information to the computer with a view to the exhibiting of the symbols on the head-up display, and two satellite positioning receivers having antennas substantially aligned with the longitudinal axis of the aircraft, the receivers supplying signals to the computer, and means for contrasting the measurements supplied by the two receivers so as to establish aircraft heading and attitude information from phase comparisons of the signals received at the same moment from the same satellite by the two receivers, means in the computer for computing an average of the deviations between the attitude and heading information calculated from the signals of the satellite positioning receivers and the attitude and heading information supplied by the AHRS unit, and means for correcting, on the basis of this average of deviations, the heading and attitude information supplied by the AHRS unit with a view to generating, from the corrected information, the symbols to be exhibited on the head-up display.

Thus, the receivers of satellite signals regularly supply accurate heading and longitudinal attitude information which allow periodic computation of a correction to the heading and longitudinal attitude information item supplied by the AHRS unit. The correction is preferably averaged over a certain number of successive error computations (sliding average) so that the information from the unit is corrected by a value which varies slowly. If this were not the case the variations in the correction value which are applied to the display at the moment at which the satellite positioning receivers compute the heading and attitude could cause unacceptable discontinuities in the position of the longitudinal attitude and heading symbols on the head-up display.

Preferably, to ensure redundancy of operation of the system should certain elements fail, there is provision for the head-up display computer to comprise two identical separate computation pathways, for there to be two heading and attitude units which supply their information to the two computation pathways respectively, and for the two satellite signal receivers each to be coupled to the two computation pathways.

In order to take into account the fact that the two antennas of the receivers are not necessarily aligned exactly with the axis of the aircraft, and not even aligned precisely with an axis parallel to the axis of the aircraft, there is provision for the attitude computed by the receivers to be modified so as to take this defect into account before it is compared with the attitude supplied by the AHRS unit. The correction depends on the roll of the aircraft and there is preferably provision for the computer of the head-up display to perform a correction to the attitude based on a table of corrections giving one correction for each roll value. The roll values are forwarded by the AHRS unit.

In respect of the computation of the trim by the satellite signal receivers, provision may be made for the two receivers to send carrier phase information to the HUD computer which itself computes the trim on the basis of two phase information items, or else for the two receivers to communicate directly, one of them computing the trim.

Communication between the receivers or communication between a receiver and the AHRS unit is carried out via ARINC bus (serial communication bus standardized for aeronautics).

Other characteristics and advantages of the invention will emerge on reading the detailed description which follows and which is given with reference to the appended drawings in which:

FIG. 1 diagrammatically represents the symbology which it is desired to exhibit on the head-up display;

Figure 5:
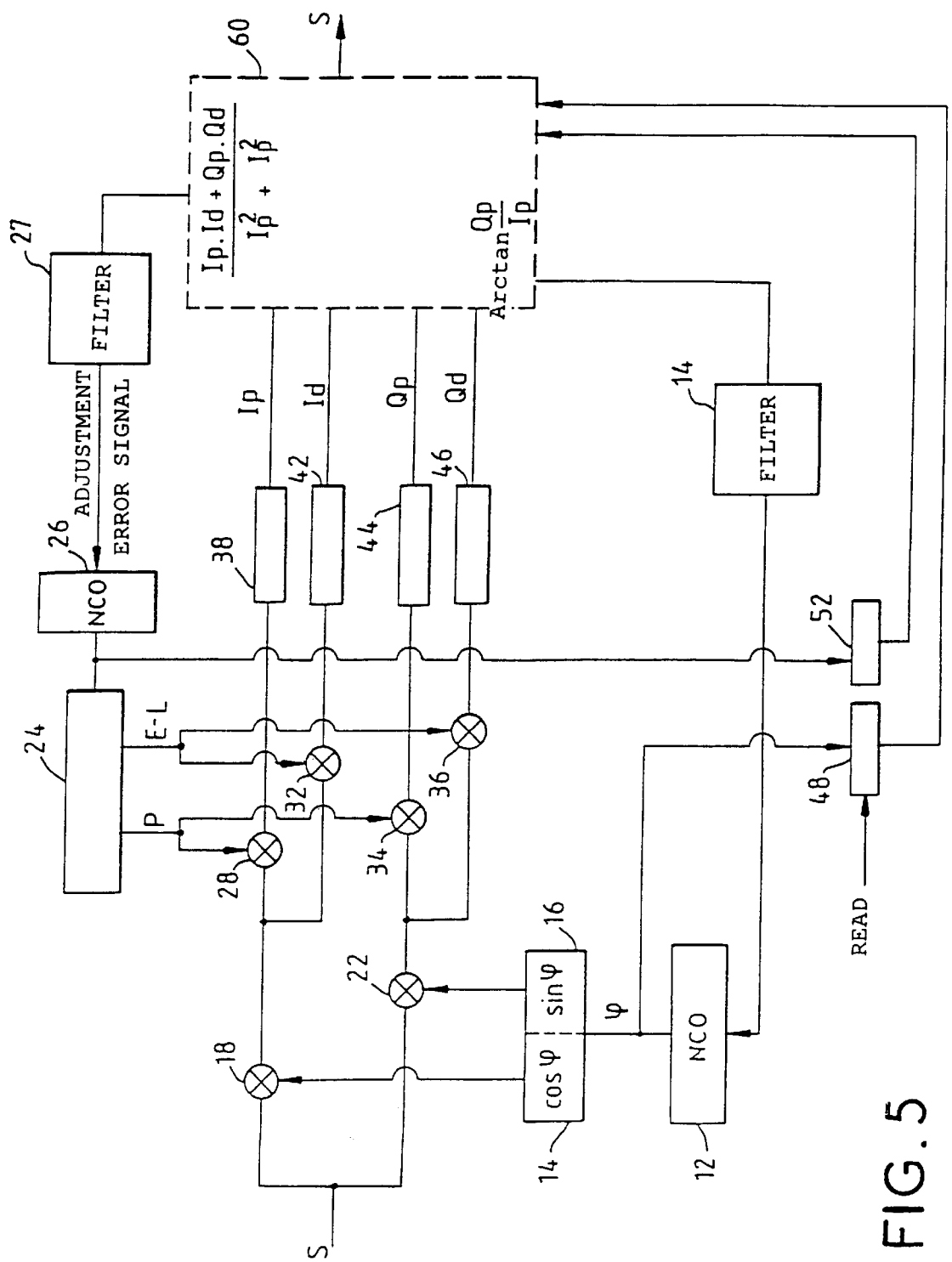

FIG. 5 the make-up of the signal processing circuit of the receiver.

Figure 1:
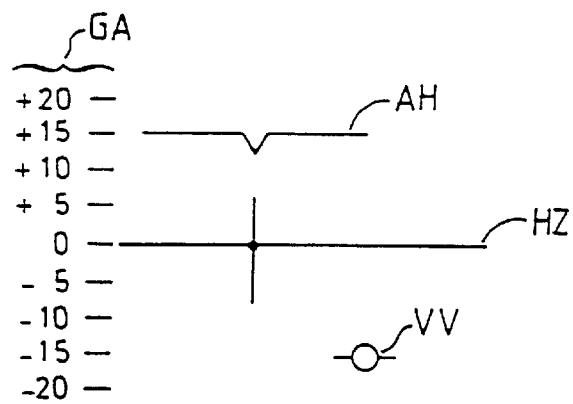

FIG. 1 represents the symbolic information which it is desired to exhibit on a head-up display (HUD) to aid piloting (take-off and landing) under difficult conditions of visibility.

An artificial horizon line HZ, which is horizontal if the aircraft is horizontal and tilted if the aircraft is tilted, is projected onto the display screen; this line remains superimposed, regardless of the trim of the aircraft, on the actual horizon line which the pilot sees through the cockpit.

A longitudinal attitude symbol AH is also projected, above the horizon line if the nose of the aircraft is pointing upwards (the normal situation, especially of course for landing and take-off where this symbol is most useful). An attitude graduation scale GA is also projected by the display, and it is possible to see at a glance whether the attitude is that desired, the attitude symbol moving past this scale as a function of the actual attitude of the aircraft.

Lastly, it is desired to display a velocity vector (velocity with respect to the ground) in the form of a symbol W whose position moves according to the inertial velocity of the aircraft. The position of the symbol W makes it possible to see at a glance the wind conditions at take-off and landing, the velocity vector being shifted sideways relative to the attitude symbol AH in the presence of wind since the actual velocity of the aircraft does not then correspond to its heading.

According to the invention, this computation uses the information originating from an AHRS non-inertial reference unit, this information being corrected by satellite positioning receivers; these receivers are in practice signal receivers of the GPS system ("Global Positioning System").

Figure 2:
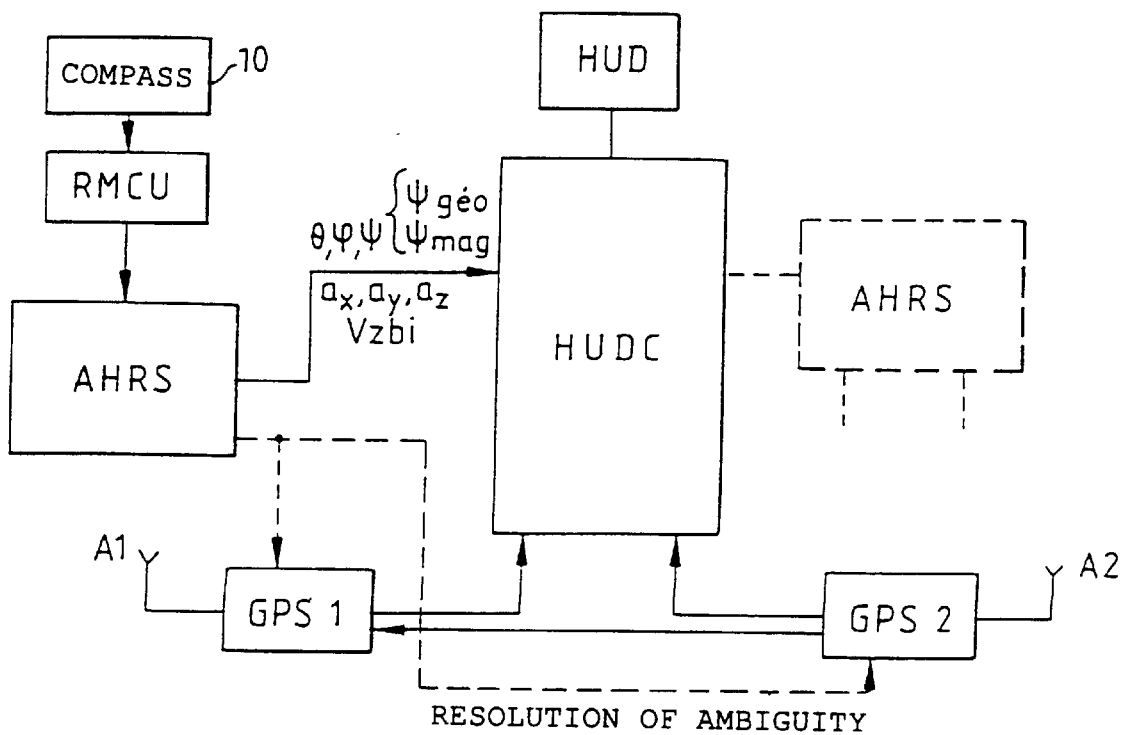
FIG. 2 represents the general make-up of the system according to the invention.

FIG. 2 represents the general organizational diagram of the system for aiding piloting according to the invention.

The AHRS unit, an attitude and heading reference unit with no inertial platform, which is a servocontrolled platform comprising gyrometric and accelerometric detectors which measure the displacements of this platform, supplies digital information over an ARINC 429 bus, relating to the magnetic heading Ψmag, longitudinal attitude θ, roll φ, accelerations ax, ay, az tied to the structure of the aircraft, and baro-inertial vertical velocity Vzbi.

This information can be displayed conventionally on dials, but here it is forwarded to the head-up display computer labelled HUDC in FIG. 2. This computer drives the head-up display HUD directly, the function of the latter being to project the abovementioned navigational aid symbols in front of the pilot.

The AHRS unit conventionally employs a compass 10 which can be a magnetometer or a flux valve, which detects the direction of terrestrial magnetic north. This direction is forwarded in the form of an analogue signal to the AHRS unit via a circuit RMCU for compensating for the magnetic masses of the aircraft.

According to the invention two satellite positioning receivers are used which are capable of supplying a carrier phase information item, these receivers supplying information such that an interferometric measurement of the phase of the radio frequency carrier is possible. These receivers must therefore both use a carrier phase servocontrol loop. It should be recalled that the positioning signals emitted by the satellites comprise a radio carrier frequency (1575.42 MHz for civil applications of the GPS system), which is phase modulated with spread-spectrum pseudo-random codes, in such a way as to make it possible to detect the signal in the presence of a very small signal/noise ratio and to detect using the same radiofrequency circuit the signals originating from several satellites corresponding to different codes. The phase changes are produced at very precise instants, so as to allow position computation by the receiver when it receives signals from several different satellites. Fine analysis of the phase shifts of the carrier between two receivers whose antennas are separated by a known distance makes it possible to calculate a direction of orientation of the line separating the phase centres of the antennas.

The receivers are denoted by the references GFS1 and GPS2. They are linked to the HUDC computer by ARINC 429 buses. The information calculated in the receivers can be gathered in several ways, as will be seen, but in all cases it must be possible for the phase measurements supplied by the two receivers to be referred to the same readout instant.

Figure 3:
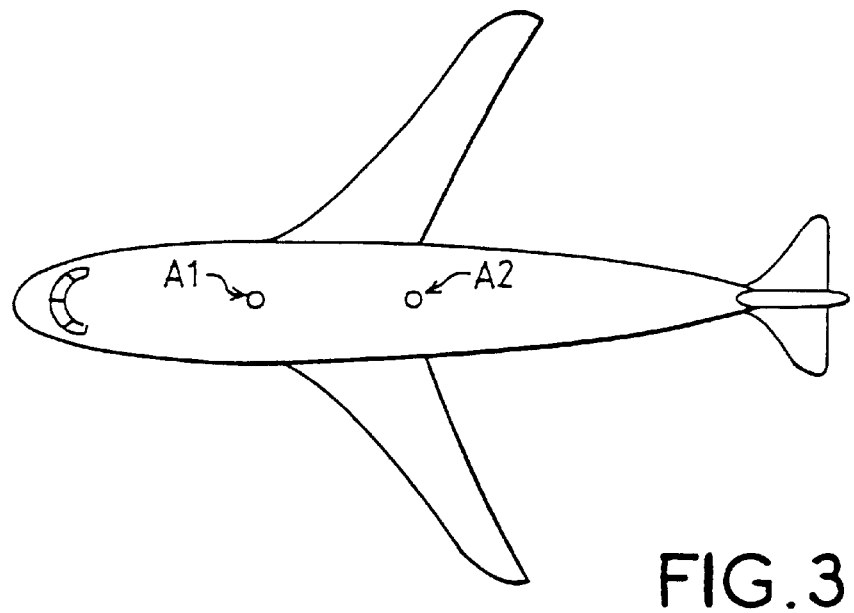
FIG. 3 represents the position of the satellite signal reception antennas.

The receiving antennas A1 and A2 of the two receivers are placed on top of the aircraft, preferably parallel to the main axis of the aircraft, and at a distance apart which is known exactly. FIG. 3 represents a top view of the aircraft with the positions of the antennas A1 and A2.

Knowing the distance A1A2 (measured between the phase centres of the antennas), it is possible to make a measurement of the vector A1A2 in a terrestrial frame and to deduce therefrom a longitudinal attitude and a heading of the aircraft in this terrestrial frame.

This information could be substituted for that which is supplied less accurately by the AHRS unit. However, according to the invention it is proposed to retain the information from the AHRS unit, correcting it periodically with the heading and attitude information supplied by the two receivers GPS1 and GPS2. In particular, this makes it possible to benefit from the faster response of the AHRS unit in the event of rapid modifications in the velocity, attitude, position of the aircraft.

One of the advantages of the invention is that there is almost no hardware to be added as compared with the apparatus which is required anyway in the aircraft: a GES receiver is required for the aircraft position and velocity measurements, and in practice two receivers are required for reasons of redundancy in the event of a breakdown. The only constraint is that it must definitely be possible to refer the information supplied by the two receivers to the same measurement instant with very high accuracy, and these receivers must moreover be able to supply carrier phase information.

The receivers used in this invention for information regarding attitude and heading (interferometric measurement between the two receivers) will therefore also measure the conventional data regarding position, velocity and time ordinarily supplied by satellite positioning receivers.

It will be noted that, just as the AHRS unit will be corrected as a function of the interferometric measurements of the receivers GPS1, GPS2, the interferometric measurement itself may use the heading information (uncorrected) supplied directly by the AHRS unit. Indeed, one of the measurement problems which arises in an interferometric measurement of carrier phase is that of ambiguity resolution since the direction of the basis vector A1A2 defined by interferometric measurement is at the outset ambiguous on account of the very short wavelength (of the order of 20 cm) of the radiofrequency carrier.

Here, the complementarity between the AHRS unit and the GPS receivers is excellent since the receivers can correct the AHRS unit, while at the outset the AHRS unit supplies the means for resolving ambiguity which make it possible to accelerate considerably the obtaining of the correction elements intended for the unit.

The correction elements can result from a periodic comparison, in the HUDC computer, of an attitude and a heading which are supplied by the AHRS unit and of an attitude and a heading which are computed by the receivers with the aid of carrier phase comparisons in the two receivers. The comparison may be made every 100 ms for example. The deviations are averaged over a certain number of periods, this preferably being a sliding average (for example the average of the deviations corresponding to the last ten comparisons is used each time). The average deviation thus computed is applied as correction to the heading and attitude values supplied by the unit. Additionally, the HUDC computer uses the corrected values to display the piloting aid symbols.

For failure prevention reasons provision may be made for a redundant system having two distinct AHRS units, the computer comprising two separate computation pathways each receiving the information from a respective unit. The receivers GPS1 and GPS2 also supply redundant information regarding position, time and velocity. However, the heading and attitude correction information item is no longer supplied if one of the receivers breaks down. In this case, the information from the AHRS units is used uncorrected.

Given that the invention necessarily uses receivers capable of supplying carrier phase information, the principle of such receivers and the nature of the information which they supply will be briefly recalled below.

Figure 4:
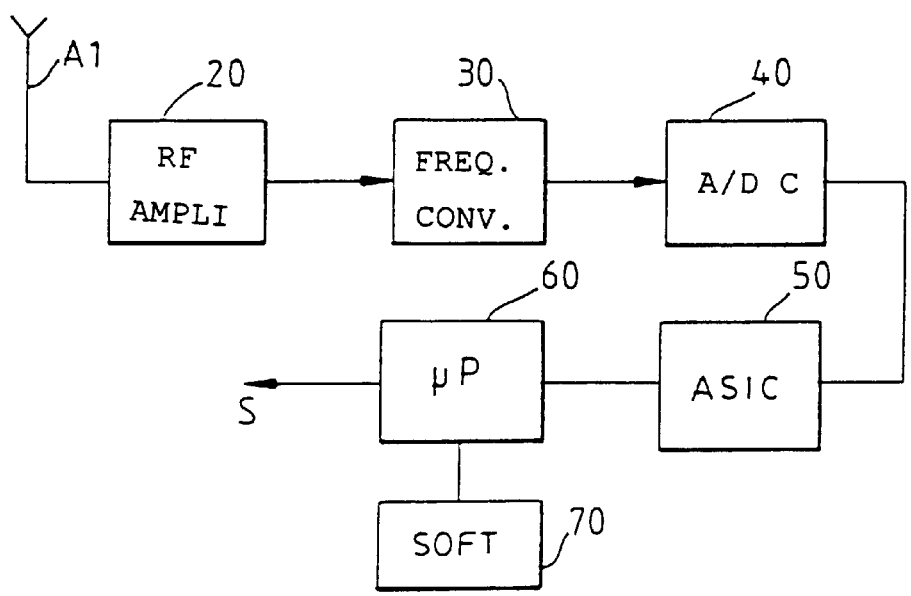
FIG. 4 represents the overall make-up of a GPS receiver.

FIG. 4 concisely recalls the general make-up of a satellite positioning receiver.

It comprises a radiofrequency part, comprising an antenna A1, a radiofrequency amplifier 20 and miscellaneous associated filtering circuits, frequency conversion circuits 30, and an analogue/digital converter 40. The converter makes it possible to supply relatively low-frequency digital signals intended to be processed in a digital signal processing circuit 50. This circuit is controlled by a microprocessor 60 and associated computational and control software 70. The microprocessor 60 supplies digital signals which are the results of measurements and computations performed on the basis of the digital signals present in the signal 50.

These signals supplied at the output S of the GPS receiver, comprise, in particular, a PVT point (position, velocity, time), required for the navigation of the aircraft, and also the digital phase information required for a more accurate aircraft heading and attitude computation than that of the AHRS unit.

If two receivers GPS1 and GPS2 intercommunicate in respect of a direction computation for the vector A1A2 separating the phase centres of the two antennas A1 and A2, this communication is carried out via the microprocessor 60; of course, if one of the receivers carries out a computation of the direction of the vector A1A2 from the information supplied by the other receiver, the software of the first comprises all the programs necessary for this computation. However, the direction computation can also be carried out in the HUDC computer if it receives only the raw phase information from the two receivers and direction cosine information for the lines of aim of the satellites rather than a computed information item for the direction vector A1A2.

FIG. 5 represents the overall make-up of the digital signal processing circuit of a GPS receiver which allows carrier phase measurement.

The signals transposed conventionally and digitized by the analogue digital converter 40 are applied to the digital signal processing circuit 50, comprising as many processing channels as satellites desired to be received at a time. In the case of multiplexed processing, the satellites may be processed in succession by the same channel. A single channel is represented in FIG. 5.

The channel conventionally comprises a double servocontrol loop: carrier phase servocontrol and code phase servocontrol.

The carrier phase loop essentially uses a local oscillator 12 with digital phase control, supplying a (sawtooth) periodic digital phase at a frequency corresponding to the transposed carrier frequency, while taking account of the Doppler effect which alters the carrier frequency transmitted by a satellite. The Doppler effect is taken into account through the very existence of the servocontrol loops, and the Doppler velocity measurement can be made from the digital signals present in the loops.

This digital phase is transformed into two periodic sinusoidal signals, in-phase and phase quadrature, by circuits 14, 16 which derive the cosine and sine of this phase. Multipliers 18, 22 make it possible to multiply the signal received from the satellite (transposed to low frequency and retaining its phase modulation representing the pseudo-random code emitted by the satellite together with other modulation data) by these sinusoidal functions.

The signal thus multiplied by a sinusoidal function on two pathways, in-phase (I pathway) and phase quadrature (Q pathway), is correlated with pseudo-random codes produced locally, so as to constitute the code servocontrol loop which makes it possible to servocontrol the local codes to the code received from the satellite and subsequently to be able to determine the precise temporal position of the local codes thus servocontrolled.

The code servocontrol loop comprises a code generator 24, driven by an oscillator 26 with digital phase control which itself receives a code correlation error signal filtered by a loop filter 27.

The code generator 24 can produce a so-called "punctual" pseudo-random code P, the replica of a code transmitted by a satellite and intended to be synchronized with this received code, and early and late codes E and L which are a short interval of time ahead of and behind the code P. In practice, the correlation can be performed with the code P and a difference code E-L. To do this, the signal from the I pathway and the signal from the Q pathway are multiplied by the code P on the one hand, and by the code E-L on the other hand, with the help of four multipliers 28, 32, 34, 36.

The outputs from these multipliers are applied to integrators 38, 42, 44, 46 respectively, of the "integrate and dump" type, which are read every millisecond (the frequency of repetition of the pseudo-random code to be detected) and periodically reset to zero at that moment.

The outputs of these digital integrators supply signals Ip, Id (correlation on the I pathway by the punctual code P and the difference code E-L) and Qp, Qd (correlation on the Q pathway by the punctual code and the difference code).

Conventionally, these signals serve to compute error signals for adjusting the code and carrier servocontrol loops. The computation is carried out in a computation circuit which in practice is the microprocessor 60 which controls the whole of the signal processing circuit and which carries out the GPS time and position computations. The adjustment error signal is preferably obtained via the scalar product of the two correlated vectors Ip, Qp, and Id, Qd, with a normalization term $Ip^2+Qp^2$ corresponding to the fact that the energies of the signals received vary over time.

The error signal is therefore of the form $$(Ip \cdot Id + Qp \cdot Qd)/(Ip^2+Qp^2)$$

This error signal is applied via the filter 27 to the oscillator 26 which drives the code generator 24. This error signal becomes zero when the energies of correlation through the codes E and L are equal, this corresponding to exact synchronism between the code received from the satellite and the punctual code delivered by the generator 24.

Another computation is carried out in parallel by the microprocessor 60 in order to supply a carrier phase error signal which will control the digital oscillator 12 via a loop filter 11. This computation is based conventionally on the evaluation of Arctan(Qp/Ip) which represents the difference of the phases of the oscillator 12 and of the carrier of the signal received. The two servocontrol loops, code and carrier, take into account the Doppler frequency shift in the carrier frequency and in the code, resulting from the relative displacement of the aircraft and of the tracked satellite. This Doppler shift can be measured in the loops.

The GPS time and position computations are performed on the basis of the state of the servocontrol loops at a specified measurement instant. At this instant, the exact state of the phase of the two digital phase control oscillators 12 and 26 is measured. This state is for example placed in memory in digital registers 48 and 52 and the contents of these registers are utilized by the microprocessor. The register 48 therefore contains the state of the phase of the carrier at the measurement instant, while the register 52 contains the state of the punctual-code phase at the same instant.

The two GPS receivers, having antennas which are very close together, supply the same position and time measurements computed from the code phase. However, they supply different measurements of carrier phase on account of the distance which separates the antennas A1 and A2.

If the measurement instant is the same for the two receivers, the carrier phase difference makes it possible to compute, after ambiguity resolution operations which are conventionally required in the realm of trim detection, a direction of the vector A1A2 and consequently a heading and a longitudinal attitude of the aircraft.

The measurement instant is not necessarily the same for the two receivers, which do not operate strictly synchronously. However, the computation of the times received, carried out in the two receivers on the basis of the code phase, makes it possible to refer the comparison of carrier phases to exactly the same measurement instant. Thus, if the GPS time received from a satellite, as measured by the receiver GPS1 is a time T1 and if the GPS time measured by the receiver GPS2 at another moment is a time T2, it is possible to compute the carrier phase shift corresponding to the interval T2–T1, and to subtract it from the phase difference computed through the contents of the registers 48 of the two receivers, so as to refer the phase shift to the value which it would have if the times T1 and T2 were coincident. The phase shift of the carrier for the interval T2–T1 is known since the carrier frequency transmitted (1575.42 MHz) and its Doppler shift are known (in practice, only the Doppler shift is relevant).

Thus, although the receivers GPS1 and GPS2 are independent, they make it possible to calculate, by interferometry on the carrier phase, the heading and attitude of the aeroplane.

If the two receivers communicate with the HUDC computer, the latter performing the calculation of heading and attitude, they both send the following digital information via ARINC buses:

identification and validity of the satellites observed at a given moment;

time received from these satellites, computed by the receivers on the basis of a phase with local code synchronized with a code received from a satellite;

Doppler velocity measured by measuring the shift in carrier frequencies transmitted by the satellites;

directions of the satellites observed, computed from the above information;

phase of the carrier measured by the phase state of the oscillator with digital phase control 12.

The HUDC computer then computes, from this information, the direction of the vector separating the two antennas and from this deduces values of heading and attitude to be compared with those supplied by the AHRS unit.

The receivers can also communicate with one another, one of the receivers, for example GPS2, supplying the other (GPS1) with the following information:

identification of the satellites observed at a given moment;

time received from these satellites, computed by the receiver on the basis of a phase with local code synchronized with a code received from a satellite;

Doppler velocity measured by measuring the shift in carrier frequencies transmitted by the satellites;

phase of the carrier measured by the phase state of the oscillator with digital phase control 12.

The same information is available to the second receiver and it calculates, from the two sets of information, the direction of the vector separating the antennas, so as to supply this direction to the HUDC computer. The latter employs this to calculate a heading and an attitude and to correct the errors of the AHRS unit.

Finally, in the case in which the vector A1A2 joining the centres of the antennas A1 and A2 is not precisely parallel to the longitudinal axis of the aeroplane, a knowledge of the direction of the vector A1A2 does not supply the heading and longitudinal attitude of the aircraft directly. If the aircraft has no roll, the parallelism error must be subtracted from the calculated direction. If the aircraft has an angle of roll at a given moment, this roll influences the co-ordinates of the parallelism error vector to be subtracted. The angle of roll can be supplied in straightforward manner by the AHRS unit, and the computer will make the necessary correction, as a function of the roll, before computing the deviations and the averages of information deviations between the trim supplied by the unit and the trim supplied on the basis of the indications from the GPS receivers.

What is claimed is:

1. A system for aiding piloting of an aircraft, comprising:
    a head-up display (HUD);
    a computer (HUDC) associated with the head-up display, the computer comprising means for controlling the head-up display to display an aircraft attitude symbol;
    a non-inertial attitude and heading unit (AHRS) configured to supply heading, attitude, acceleration and vertical velocity information to the computer;
    a plurality of satellite positioning receivers having antennas substantially aligned with a principal axis of the aircraft, the receivers supplying signals to the computer; and
    means for contrasting measurements supplied by the receivers to establish aircraft heading and attitude information based upon phase comparisons of signals received by the receivers from a common satellite,
    wherein the computer further comprises means for computing an average of deviations between the attitude and heading information calculated from the signals of the satellite positioning receivers and the attitude and heading information supplied by the AHRS unit, and means for correcting, on the basis of the computed average of the deviations, the heading and attitude information supplied by the AHRS unit, the head-up display displaying symbols based upon the corrected heading and attitude information.

2. The system according to claim 1, wherein the computed average of the deviations is a sliding average, the sliding average being based upon a predetermined number of deviations.

3. The system according to claim 1, wherein the computer further comprises,
    means for supplying an aircraft heading and attitude information item that is corrected based upon a difference of direction between a vector separating two of the antennas and a principal longitudinal axis of the aircraft, and
    means for adjusting the heading and attitude information based upon roll information associated with the aircraft, the roll information being supplied by the AHRS unit.

4. The system according claim 1, wherein the receivers perform trim computations through phase comparisons, including a phase ambiguity removal computation, in which, the phase ambiguity removal computation makes use of a heading and attitude information supplied by the AHRS unit.

5. The system according to claim 1, wherein each of the satellite positioning receivers is configured to transmit data information to the computer, the data information comprising satellite identification information corresponding to satellites observed at a given moment, timing information received from the satellites and computed by the receivers based upon a phase with local pseudo-random code synchronized with a code received from one of the satellites, Doppler velocity information based upon measuring a shift in carrier frequencies transmitted by the satellites, direction information of the satellites and phase information, wherein the computer being configured to determine a direction of a vector separating two of the antennas based upon the received data information.

6. The system according to claim 1, wherein one of the satellite positioning receivers is configured to transmit data information via a bus to another one of the satellite positioning receivers, the data information comprising satellite identification information corresponding to satellites observed at a given moment, timing information received from the satellites and computed by the receivers based upon a phase with local pseudo-random code synchronized with a code received from one of the satellites, Doppler velocity information based upon measuring a shift in carrier frequencies transmitted by the satellites, and phase information, wherein the other one of the satellite positioning receivers being configured to compute a direction of a vector separating two of the antennas based upon the data information, and to transmit direction information corresponding to the computed direction of the vector to the computer.

7. The system according the claim 2, wherein the computer further comprises,
    means for supplying an aircraft heading and attitude information item that is corrected based upon direction of a vector separating two of the antennas, and
    means for adjusting the heading and attitude information based upon roll information associated with the aircraft, the roll information being supplied by the AHRS unit.

8. The system according to claim 2, wherein the receivers perform trim computations through phase comparisons, including a phase ambiguity removal computation, in which the phase ambiguity removal computation makes use of a heading and attitude information supplied by the AHRS unit.

9. The system according to claim 3, wherein the receivers perform trim computations through phase comparisons, including a phase ambiguity removal computation, in which the phase ambiguity removal computation makes use of a heading and attitude information supplied by the AHRS unit.

10. The system according to claim 2, wherein each of the satellite positioning receivers is configured to transmit data information to the computer, the data information comprising satellite identification information corresponding to satellites observed at a given moment, timing information received from the satellites and computed by the receivers based upon a phase with local pseudo-random code synchronized with a code received from one of the satellites, Doppler velocity information based upon measuring a shift in carrier frequencies transmitted by the satellites, direction information of the satellites, and phase information, wherein the computer being configured to determine a direction of a vector separating two of the antennas based upon the received data information.

11. The system according to claim 3, wherein each of the satellite positioning receivers is configured to transmit data information to the computer, the data information comprising satellite identification information corresponding to satellites observed at a given moment, timing information received from the satellites and computed by the receivers based upon a phase with local pseudo-random code synchronized with a code received from one of the satellites, Doppler velocity information based upon measuring a shift in carrier frequencies transmitted by the satellites, direction information of the satellites, and phase information, wherein the computer being configured to determine a direction of a vector separating two of the antennas based upon the received data information.

12. The system according to claim 4, wherein each of the satellite positioning receivers is configured to transmit data information to the computer, the data information comprising satellite identification information corresponding to satellites observed at a given moment, timing information received from the satellites and computed by the receivers based upon a phase with local pseudo-random code synchronized with a code received from one of the satellites, Doppler velocity information based upon measuring a shift in carrier frequencies transmitted by the satellites, direction information of the satellites, and phase information, wherein the computer being configured to determine a direction of a vector separating two of the antennas based upon the received data information.

13. The system according to claim 2, wherein one of the satellite positioning receivers is configured to transmit data information via a bus to another one of the satellite positioning receivers, the data information comprising satellite identification information corresponding to satellites observed at a given moment, timing information received from the satellites and computed by the receivers based upon a phase with local pseudo-random code synchronized with a code received from one of the satellites, Doppler velocity information based upon measuring a shift in carrier frequencies transmitted by the satellites, and phase information, wherein the other one of the satellite positioning receivers being configured to compute a direction of a vector separating two of the antennas based upon the data information, and to transmit direction information corresponding to the computed direction of the vector to the computer.

14. The system according to claim 3, wherein one of the satellite positioning receivers is configured to transmit data information via a bus to another one of the satellite positioning receivers, the data information comprising satellite identification information corresponding to satellites observed at a given moment, timing information received from the satellites and computed by the receivers based upon a phase with local pseudo-random code synchronized with a code received from one of the satellites, Doppler velocity information based upon measuring a shift in carrier frequencies transmitted by the satellites, and phase information, wherein other one of the satellite positioning receivers being configured to compute a direction of a vector separating two of the antennas based upon the data information, and to transmit direction information corresponding to the computed direction of the vector to the computer.

15. The system according the claim 4, wherein one of the satellite positioning receivers is configured to transmit data information via a bus to another one of the satellite positioning receivers, the data information comprising satellite identification information corresponding to satellites observed at a given moment, timing information received from the satellites and computed by the receivers based upon a phase with local pseudo-random code synchronized with a code received from one of the satellites, Doppler velocity information based upon measuring a shift in carrier frequencies transmitted by the satellites, and phase information, wherein the other one of the satellite positioning receivers being configured to compute a direction of a vector separating two of the antennas based upon the data information, and to transmit direction information corresponding to the computed direction of the vector to the computer.

* * * * *